United States Patent
Smith et al.

(10) Patent No.: US 7,441,030 B1
(45) Date of Patent: Oct. 21, 2008

(54) DELIVERY OF CONTINUOUS REAL-TIME PERFORMANCE DATA OVER THE INTERNET

(75) Inventors: Harry K Smith, Hayward, CA (US); Jon H Peterson, Larkspur, CA (US); Mark Hughes, Oakland, CA (US); Anthony Kostichka, Wilmington, DE (US); Brian Bostwick, Wayne, PA (US)

(73) Assignee: OSIsoft, Inc., San Leandro, CA (US)

( * ) Notice: Subject to any disclaimer, the term of this patent is extended or adjusted under 35 U.S.C. 154(b) by 913 days.

(21) Appl. No.: 10/791,677

(22) Filed: Mar. 1, 2004

Related U.S. Application Data

(60) Provisional application No. 60/451,367, filed on Feb. 28, 2003.

(51) Int. Cl.
*G06F 15/173* (2006.01)
(52) U.S. Cl. .......................... 709/225; 726/4
(58) Field of Classification Search ................ 709/219, 709/226, 231, 225; 715/513; 717/103; 700/87; 719/315; 707/513; 726/4
See application file for complete search history.

(56) References Cited

U.S. PATENT DOCUMENTS

| | | | |
|---|---|---|---|
| 6,725,446 B1 * | 4/2004 | Hahn et al. ................. | 717/103 |
| 7,085,842 B2 * | 8/2006 | Reid et al. ................... | 709/231 |
| 7,123,974 B1 * | 10/2006 | Hamilton ..................... | 700/87 |
| 2002/0032701 A1 * | 3/2002 | Gao et al. .................... | 707/513 |
| 2003/0046396 A1 * | 3/2003 | Richter et al. ............... | 709/226 |
| 2003/0212765 A1 * | 11/2003 | Takeuchi et al. ............ | 709/219 |
| 2004/0024845 A1 * | 2/2004 | Fishhaut et al. ............. | 709/219 |
| 2004/0205564 A1 * | 10/2004 | Brayton et al. .............. | 715/513 |
| 2005/0278726 A1 * | 12/2005 | Cano et al. .................. | 719/315 |

* cited by examiner

*Primary Examiner*—Jungwon Chang
(74) *Attorney, Agent, or Firm*—Fenwick & West LLP

(57) ABSTRACT

A data retrieval engine accesses data streams ("tags") from data sources. Each data stream preferably includes a plurality of values for a tag and a time each value was recorded. A user accesses the web server to request real-time performance data for a plurality of the tags. After authenticating the user, the data retrieval engine sends values for tags the user is authorized to view to the web server, for delivery to the browser. The data retrieval engine tracks which values were sent to the web server for each user and when. When the data retrieval engine receives a request for a specific user, only data not previously provided to the web server for that user is provided for the current request. In this manner, the user does not miss any events, and is provided substantially in real time with a complete set of data for requested tags.

20 Claims, 6 Drawing Sheets

Fig 4
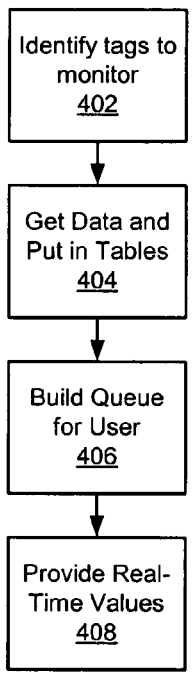
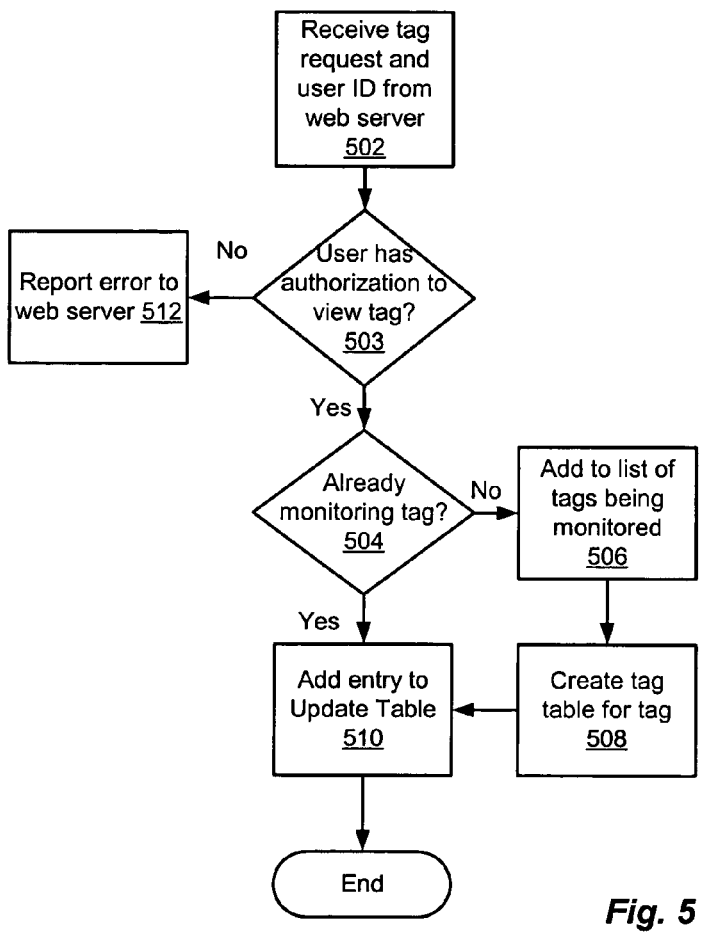
Fig. 5

DELIVERY OF CONTINUOUS REAL-TIME PERFORMANCE DATA OVER THE INTERNET

CROSS-REFERENCE TO RELATED APPLICATIONS

This application claims the benefit of Provisional Application No. 60/451,367, filed Feb. 28, 2003, which is incorporated by reference herein in its entirety.

BACKGROUND OF THE INVENTION

1. Field of the Invention

The present invention relates generally to providing real-time data over a stateless network connection. More specifically, the present invention allows users of conventional web browsers to view data streams over the Internet without missing interim data points.

2. Description of the Related Art

A number of software applications exist that provide access to real-time process data. One such software package is the PI Server from OSIsoft of San Leandro, Calif. These systems acquire, store, and processes large amounts of enterprise-wide data, transforming them into valuable information. Data is typically acquired from a plant or process, usually from automated control systems or other sources. Data are routed through the system, where processing tools transform them into useful information. Programming libraries make that information available to client applications on demand, which present the information in various formats including interactive displays and reports. Significantly, these data archival systems can typically store large amounts of raw measurement data at their original resolution. Using client application programs designed to access data from the back-end system, personnel throughout the enterprise gain access to the real-time information. While a primary application for systems such as these is in process industries, they have general application to any situation where large volumes of important data need to be managed with precision, such as network monitoring.

In these applications, "real time" data is typically data that is measured on the order of seconds, and sometimes sub-second resolution. This data has traditionally been accessed using dedicated client applications operating over a local network. Porting these applications to a web client interface, however, has been problematic because of the web's stateless architecture. Since process monitoring applications typically have tens of thousands of measurements being recorded all at once, there is a need for a way to provide the same data through the web as would normally be provided through the regular client software, and to be able to support multiple simultaneous users seeing the data substantially in real time, and without missing any of the data points.

In the architecture of the web, and more specifically, the HTTP protocol, browsers communicate with web servers in a stateless way, and a web server does not generally know when a subsequent request is coming from the same user that has already been validated by the web server and is connected with the context of his previous queries.

For applications such as the process monitoring application, where real-time data performance can be critical, and for applications which must accumulate data as it arrives, missing any data points is unacceptable. Consider a web server that serves web pages including performance data to a browser. Suppose that the web server provides the most current value of a certain sensor each time a request arrives from the browser for the web page, and that the sensor is monitoring the condition of a valve—either open or closed. Suppose again that the browser is able to receive a new version of the web page every 15 seconds. The following situation is possible: at time t0, when the browser first receives the page, the valve is open. Four seconds later, at time t4, the valve closes for two seconds, opening again at time t6. At time t15, the browser receives the updated page, showing that the valve is open. As far as the end user running the browser is concerned, the valve never closed. In truth, the valve did close, which could be of the utmost importance to the person viewing the data. Clearly, this is an unacceptable outcome. Similarly, where data must be accumulated over time, missing an event results in an incorrect total.

The problem is not solved simply by increasing the rate at which the browser requests a refresh from the web server. First, data values may change for certain data streams more often than the fastest refresh settings permitted by the browser. Second, latency in the browser/server connection means there is no guarantee that pages can be retrieved at the specified refresh rate. Accordingly, a faster refresh rate does not provide a useful solution.

In addition, providing access to the data over the web requires that extra security be undertaken to authenticate users both at the point the user accesses the web server, and also with respect to the user's access to the back-end data itself.

In view of the foregoing, a need therefore exists for a system and method of providing continuous real-time process data over the world wide web in a complete, secure, and efficient manner.

SUMMARY OF THE INVENTION

The present invention satisfies the foregoing need by enabling a system and method for providing real-time performance data over the Internet via the world wide web. A system in accordance with an embodiment of the present invention includes a web server, a data store, and a data retrieval engine. The data retrieval engine accesses data streams ("tags") from one or more data sources. Each data stream preferably includes a plurality of values for a tag and a time at which each of those values were recorded. A user accesses the web server to request real-time performance data for one or more of the tags. After authenticating the user and determining that the user is authorized to view the tag data requested, the data retrieval engine sends values for the tags to the web server, for delivery to the browser. The data retrieval engine keeps track of which values were sent to the web server for each user, and at what time, so that each time the data retrieval engine receives a request from the web server for a specific user, only data not previously provided to the web server for that user is provided for the current request. In this manner, the web server and optionally the user is provided substantially in real time with a complete set of data for requested tags that he is authorized to view, without the need for a dedicated client application software package.

BRIEF DESCRIPTION OF THE DRAWINGS

FIG. 4 is a flow chart describing an overview of the operation of a data retrieval engine in accordance with an embodiment of the present invention.

FIG. 5 is a flow chart for adding entries to an update table in accordance with an embodiment of the present invention.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
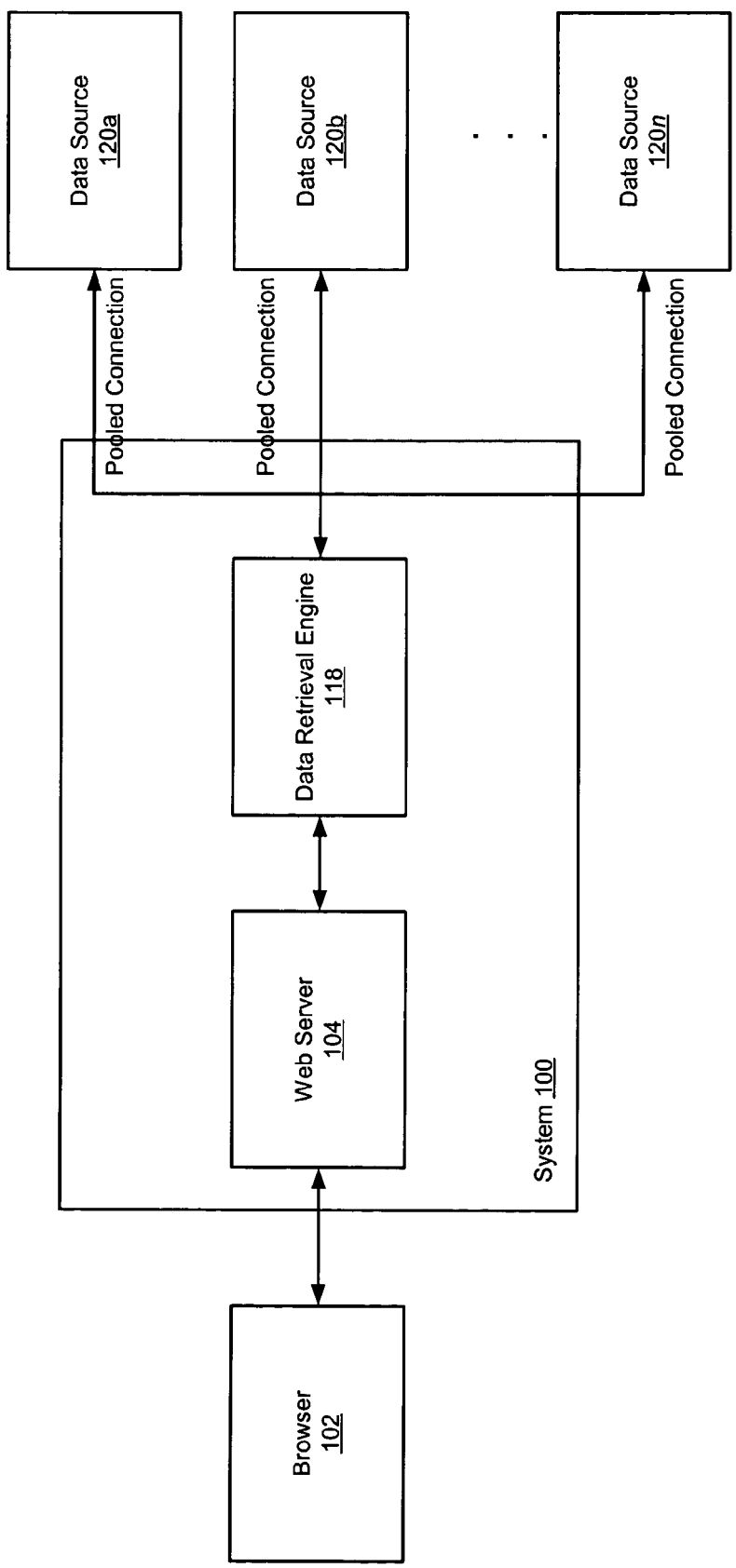
FIG. 1 is a block diagram of a system in accordance with an embodiment of the present invention.

The present invention enables access to real-time process data using a conventional web-based browser or any other application having a need for real-time data and that can communicate with a web service. Referring now to FIG. 1, there is shown a block diagram describing an overview of a system in accordance with an embodiment of the present invention. System 100 includes a web server 104 in communication with a Data Retrieval Engine (DRE) 118. Also shown in FIG. 1 are a browser 102 and multiple data sources 120. In a preferred embodiment, browser 102 is a conventional Internet browser such as Microsoft Internet Explorer or Netscape Navigator. A user uses browser 102 to access system 100 in order to view real-time information across a network such as the Internet. Web server 104 communicates with browser 102 to serve the requested real-time data. In addition, web server 104 performs authentication functions for system 100 to ensure that only authorized users are able to access system 100. Web server 104 includes a web application running on the web server computer (in or out of process) that is preferably written using conventional techniques such as ASP, CGI, ISAPI, J2EE, JavaBeans, javascript, vbscript, etc. and which communicates with DRE 118 to handle requests, and build web pages to be returned to the user. DRE 118 provides the real-time data to web server 104 so that it can be served to the browser 102. DRE 118 is in communication with and obtains the source real-time data from data sources 120. As illustrated in FIG. 1, DRE 118 may be in communication with more than one data source. The functionality of web server 104 and DRE 118 is described further below.

In a preferred embodiment and as described above, different streams of data are available from data source 120. Each stream of data is referred to as a "tag". When a user accesses system 100 through browser 102, web server 104 in one embodiment displays a list of available tags to be tracked. Every tag offered by data source 120 may be listed by web server 104, or alternatively the tags offered by web server 104 are only those that the particular user accessing web server 104 is authorized to view. In one embodiment, a user can search for particular tags from among the list of all tags. Once a user has selected one or more tags to view, web server 104 passes to DRE 118 the user's credentials, including for example a user ID, and the list of tags the user wants to view. In one embodiment, further authentication is performed with the hosting operating system using these credentials. The operating system then maps the credentials to a corresponding account from a security system on data store 120, ensuring that the user can only access authorized data.

Figure 2:
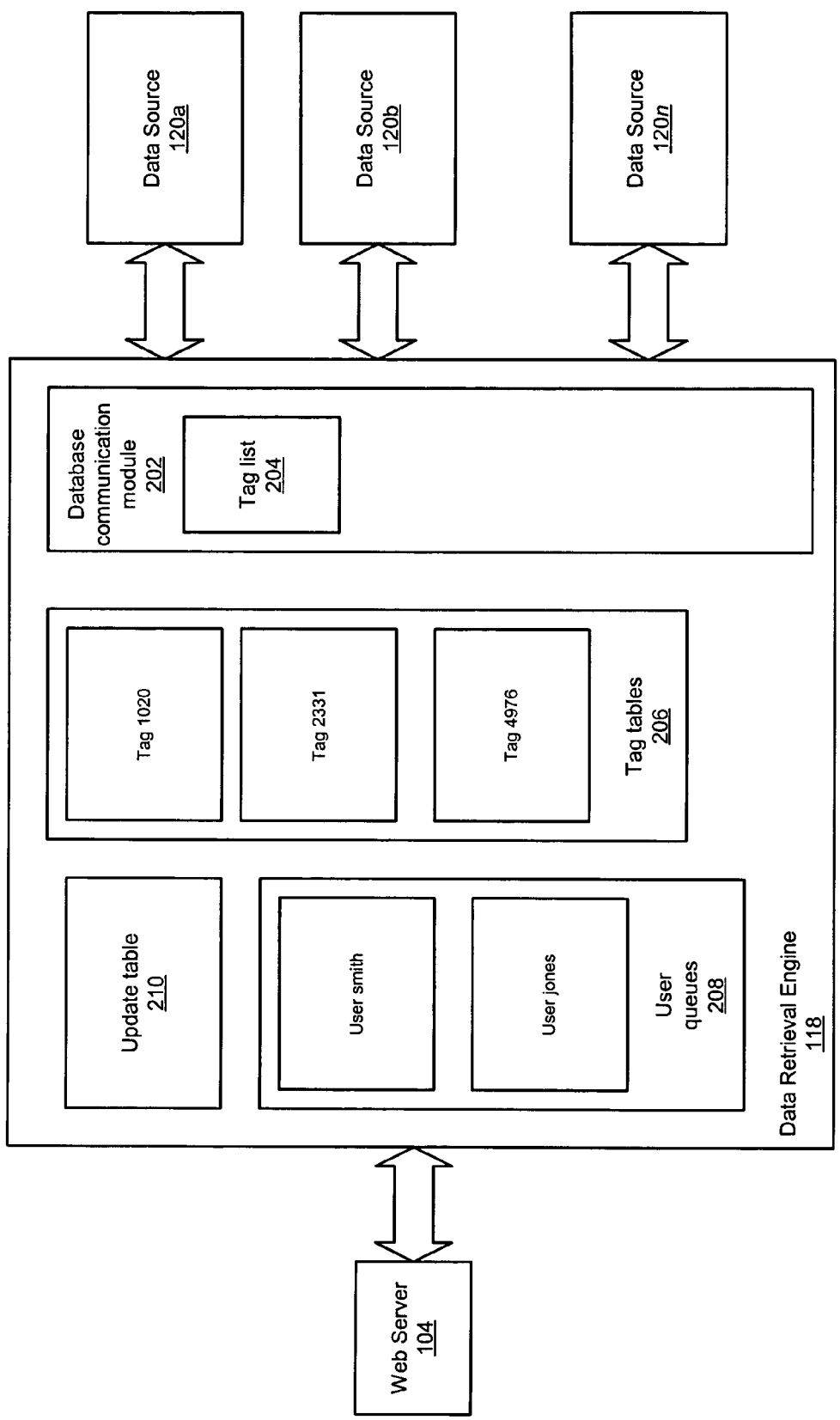
FIG. 2 is a block diagram of a data retrieval engine in accordance with one embodiment of the present invention.

Referring now to FIG. 2, there is shown a block diagram of Data Retrieval Engine 118 in accordance with one embodiment of the present invention. DRE 118 includes a database communication module 202, tag list 204, tag tables 206, user queues 208 and update table 210. Each component is described further below.

Figure 3:
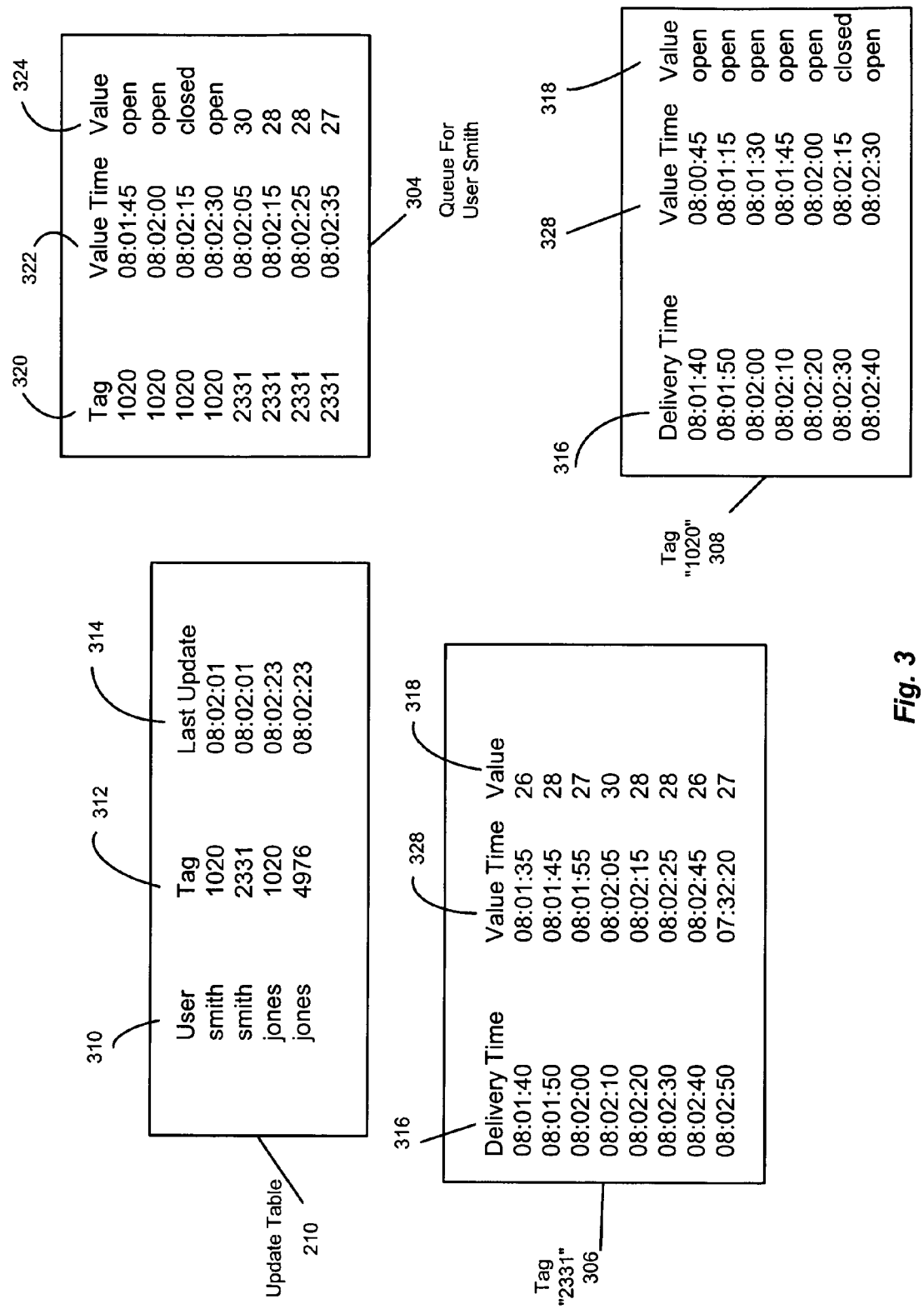
FIG. 3 provides examples of tags, an update table, and a queue in accordance with an embodiment of the present invention.

In a preferred embodiment, when DRE 118 receives the user credentials and list of tags from web server 104, it enters the information into update table 210. One example of an update table 210 is shown in FIG. 3. Each entry in update table 210 includes a user ID 310, a tag 312, and a "last update" time 314. The last update time 314 indicates the last time at which DRE 118 provided values for the indicated tag 312 to web server 104 for the indicated user 310. The user ID in one embodiment is the user's ID known to web server 104. For example, if web server 104 is running the Windows XP operating system, then the user ID could be the user's Windows login name or a token representing that user's login identity on a trusted domain (SID). In addition, the user may also have the same or a different ID for purposes of accessing data source 120. In that instance, a mapping is maintained from the web server user ID to the data source user ID. For clarity of illustration, we assume in these examples that the user ID is the same for web server 104 and data source 120. In the example shown in FIG. 3, users having the IDs of smith and jones have requested real-time data from system 100. User smith has asked for tags 1020 and 2331, and both tags were last provided to web server 104 for delivery to user smith at time 08:02:01. User jones has asked for tags 1020 and 4976, and both tags were last provided by DRE 118 to web server 104 for delivery to user jones at time 08:02:23.

In FIG. 1, data source 120 can be any of a number of systems designed to provide streams of data. In a preferred embodiment, data source 120 is the PI System by OSIsoft, Inc. of San Leandro, Calif. Those of skill in the art will appreciate that the particular manner in which data source 120 provides a stream of data may vary depending on the way in which the data source is implemented. To be efficient, in a preferred embodiment, the data source supports a subscription service where newly received data values for indicated streams are provided to validated user connections regardless of the time associated with the value, meaning values may be provided out of order. Database communication module 202 can identify and retrieve data from a particular stream of data that is new for the user, i.e. it can establish communication with data source 120, and given a tag it retrieves all values for that tag that the user has not yet seen.

In FIG. 2, database communication module 202 includes a tag list 204. For each tag in tag list 204, database communication module 202 monitors the data stream identified by the tag ensuring that each value seen by the data source for the tag is retrieved by the module 202. Each value of the tag received by database communication module 202 is written to a tag table 206 for that tag. FIG. 3 shows two examples of a tag table 306, 308. Each tag table maintains a list of value times 328, values 318 and delivery times 316. Delivery time 316 is a time at which tag data was provided by data source 120 to database communication module 202, value time 328 is the time at which the tag was measured, and value 318 is the value of the tag at the value time. For example, for tag table 306, at time 08:02:05 the value of the tag was measured to be 30. Subsequently, at time 08:02:10, that value and its value time were delivered to DRE 118 and written to tag table 306. A process for creating tag tables is described further below with respect to FIG. 6. Note that in this description, examples given for tag values are relatively simple, such as a particular number ("30") or a condition ("open"). However, tag values in other embodiments are significantly more complex, such as a combination of status and numeric value, or a comment string, or even an image. Also note that while throughout this description we describe tag values as being "measured," the term should be understood to relate to some value for the tag that is relevant to the context of the tag itself. For example, consider a lab tag, in which a complicated test is made, a person enters the test data into an application and it arrives via data source 120 to system 100. In another context, tag data could be an operator comment, and the value time is when the operator made the comment. Thus, the value time should be broadly understood to refer to a time at which the value applies, and is context sensitive to the value type.

As described above, the update table 210 indicates for each user and each tag the last time values for the tag were sent to the web server 104. By comparing the last update time for a tag in the update table 210 to delivery times 316 listed in the tag's tag table 206, DRE 118 identifies values for the tag that have not been provided to a particular user. For example, according to the update table 210 in FIG. 3, tags 1020 and 2331 are being monitored for user smith. The tags were last provided to the web server 104 for delivery to user smith at time 08:02:01. From the tag table 306 for tag 2331, we see that there have been four values for the tag written to the tag table since 08:02:01—specifically, at times 08:02:10, 08:02:20, 08:02:30 and 08:02:40. Accordingly, the corresponding value times and values for each of those delivery times should be provided to user smith the next time web server 104 requests an update for user smith. Similarly, from tag table 308 we see that there have been four values for tag 1020 received since 08:02:01—again, at 08:02:10, 08:02:20, 08:02:30, and 08:02:40. The corresponding values and value times should also be provided to user smith the next time web server 104 requests an update for him. Note that in this case, user smith is receiving values for tag 1020 that were measured before his last update time, but were not delivered until after the last update time. This is the reason that both delivery time and value time are tracked in tag table 306. For example, at 8:01:45, the value of tag 1020 was "open", but since this was not delivered until 8:02:10, it could not have been in smith's last update at 8:02:01.

DRE 118 prepares a queue for each user identified in update table 210 when an updated request is received from web server 104. In this context, an update request corresponds to a browser requesting a new page or additional tags. The queue is populated with data using the logic just described. An example queue 304 for user smith is shown in FIG. 3. As can be seen from the example, each entry in the queue includes a tag 320, a value time 322 that the tag data was measured, and a value 324 for the tag at that time.

When web server 104 requests an update from DRE 118, it includes the user ID associated with the request. From the provided user ID, DRE assembles the appropriate queue for that user as discussed above and sends it to web server 104. Note that in an alternative embodiment, DRE 118 prepares the user queues ahead of time for user IDs in the update table, instead of waiting for the update request from web server 104. When web server 104 receives the user queue, it dynamically assembles a web page using conventional protocols and programming languages such as HTML, XML, Javascript, etc., and serves the page to browser 102. In a preferred embodiment, the data sent from web server 104 to browser 102 includes only the queued data, meaning that data that has previously been served by web server 104 to browser 102 is not re-transmitted, thus saving time and bandwidth in the browser/server transaction. In one embodiment, dynamic HTML or script executing on browser 102 converts XML data from web server 104 into HTML or scalable vector graphics (SVG). In an alternative embodiment, web server 104 creates the HTML or SVG representation of the data and then sends that to browser 102.

Once a tag's value has been delivered to web server 104 for each user ID signed up to receive it, as detailed in the update table, the value is removed from the tag table 306. Put another way, a tag value 318 having a delivery time 316 earlier than any last update time 314 for that tag in the update table 210 is removed by the DRE 118.

At some point, a user receiving updates will no longer send refresh requests from browser 102 to web server 104. For example, the user may have closed his browser or gone to another web site. As a result, web server 104 no longer receives refresh requests from browser 102. Accordingly, the last update field 314 of update table 210 is unchanging. In a preferred embodiment, after an update field has remained unchanged for a predefined period of time, e.g., two minutes, the entry associated with that field is removed from the update table. If the tag identified in the entry is not present in any other entries of the update table 210, the tag is removed from tag list 204 so that database communication module 202 no longer monitors the data stream for that tag, and the tag table 206 for the tag is deconstructed. Finally, in an embodiment in which the user queues 208 are constructed in advance of requests from web server 104 instead of on the fly, if the entry is the last remaining entry in the table for that user, any queues 208 for that user are also deconstructed.

Referring now to FIG. 4, there is shown a flow chart describing an overview of the operation of DRE 118 in accordance with an embodiment of the present invention. DRE 118 first identifies 402 a list of tags to be monitored. As described above, this information is preferably provided by web server 104 responsive to selection by the user. Alternatively, a client application monitoring specific data streams, such as an alarm package, requests specific preconfigured tags using web services. Next, DRE 118 signs up for and continuously receives 404 data from Data Sources 120 for those tags and stores the data in tag tables 206. DRE 118 also adds entries to update table 210 to keep track of when the user has received updates for each tag of interest. DRE 118 then builds 406 a queue for each user registered to receive tags. Finally, DRE 118 provides 408 the real-time values to the web server 104 for delivery to the user requesting them.

FIG. 5 shows a more detailed flow chart for adding entries to update table 210. To begin, DRE 118 receives 502 a tag and a user ID from web server 104. This indicates that the identified user wishes to receive updates for the data stream identified by the tag. DRE 118 then determines 503 whether the user is authorized to access that tag data. If not, then DRE 118 reports 512 an error back to web server 104. Otherwise, DRE 118 checks whether 504 the identified tag is already being monitored, and that the request is not a duplicate for that user. In one embodiment, DRE 118 examines tag list 204 to see if the tag is listed in the tag list. If so, then the tag is already being monitored. If not, then the tag is added 506 to tag list 204, and a tag table 206 is created 508 in which to store new tag values over time. Next, an entry is added 510 to refresh update table 210 identifying the user and tag. In a preferred embodiment, the current time stamp is also added to the entry in the update table 210 indicating the most recent refresh time for that user.

Figure 6:
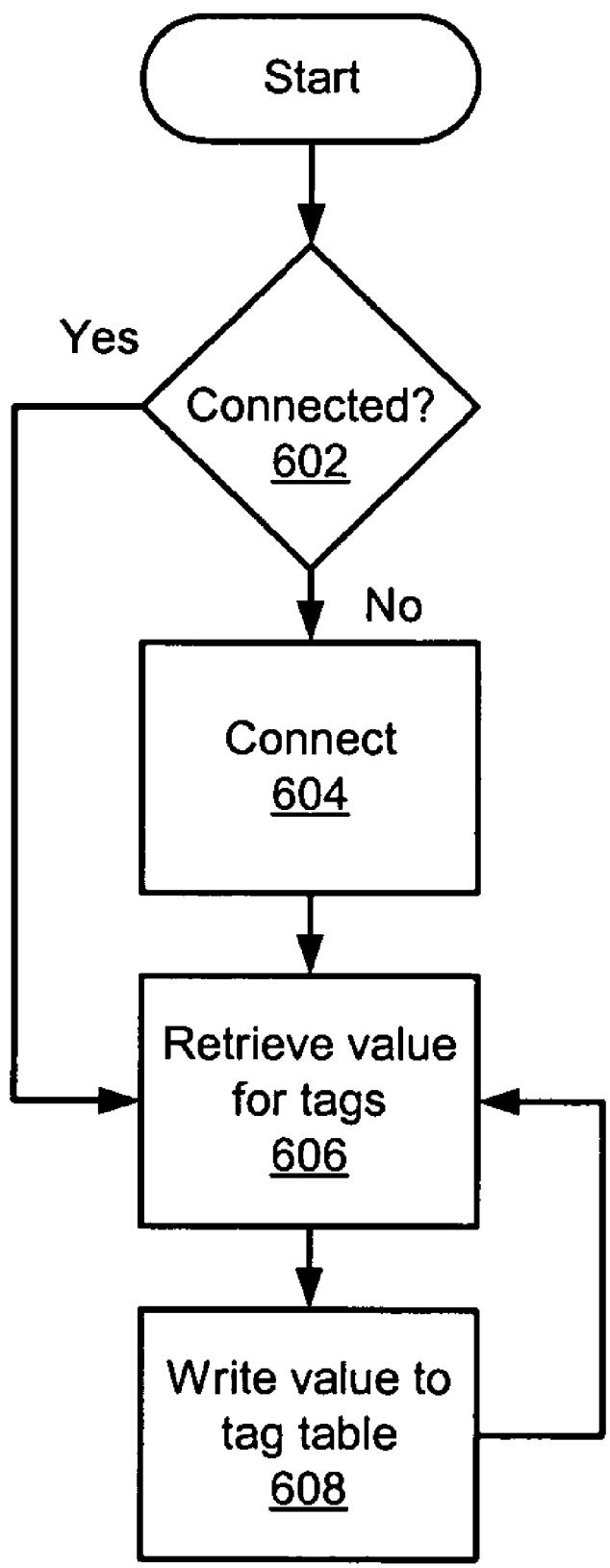
FIG. 6 illustrates the operation of a database communication module in accordance with an embodiment of the present invention.

FIG. 6 illustrates in further detail the operation of database communication module 202 in accordance with an embodiment of the present invention. Database communication module 202 first confirms 602 that it is connected to data source 120. This connection can be made using protocols such as a SQL Server communications protocol, OSIsoft's Pinet protocol, or others known in the art. If database communication module 202 is not already connected to data source 120, then it establishes 604 such a connection. The credentials used at this point are preferably those that are authorized to retrieve all data regardless of the requested user. In a preferred embodiment, module 202 is authenticated by data source 120, and is capable of reconnecting with the same authorization if the connection is temporarily interrupted. Next, database communication module 202 begins retrieving 606 data for the tags identified in tag list 204. As data is retrieved, it is then written 608 to tag tables 206. In a preferred embodiment, only data newly arrived at the data source is provided. In an alternative embodiment, such as when this capability is not available from the data source, data is retrieved based on the time associated with each value.

Figure 7:
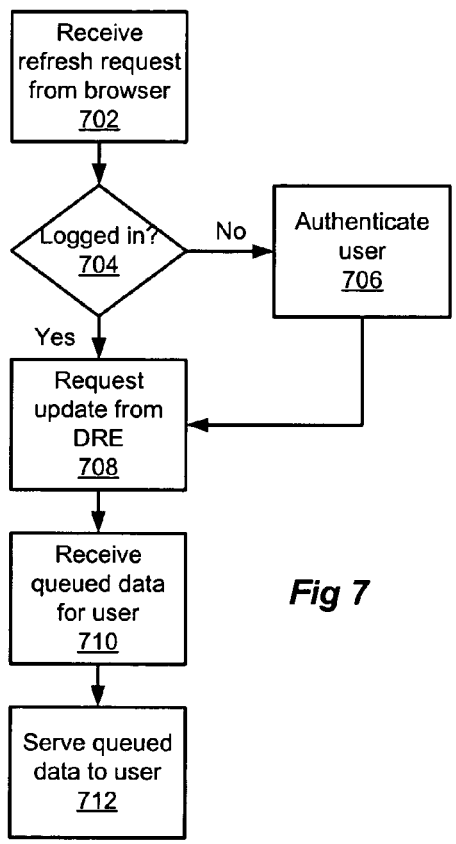
FIG. 7 illustrates a method for providing queued data to a web server in accordance with an embodiment of the present invention.

FIG. 7 illustrates a method for providing queued data to the web server 104. First, web server 104 receives 702 a request for a refreshed page from browser 102. If the user is not already logged in 704 to system 100, he is authenticated 706 by web server 104. Once the user is logged in, web server 104 requests 708 an update from DRE 118 based on the user's tag selection, as described above with respect to FIG. 5. Web server 104 then receives 710 the update for the user, and serves 712 the queued data to browser 102. The queued data is assembled as described next with respect to FIG. 8.

Figure 8:
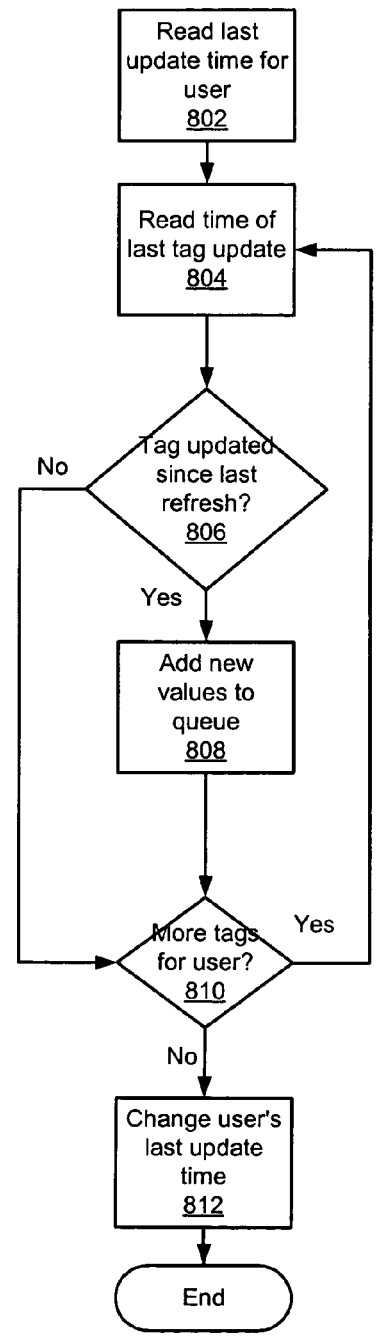
FIG. 8 illustrates a method for assembling queued data in accordance with an embodiment of the present invention.

When DRE 118 receives a request for an update from web server 104, it builds a queue for the indicated user. One embodiment of a method for building the user queues 208 is illustrated in FIG. 8. First, DRE reads 802 the last update time 314 for each the indicated user 310 in the update table 210. Next, DRE 118 checks 804 the last tag delivery time 316 for the tag in the relevant tag table 306. If 806 there are entries with delivery times later than the last time an update was provided to the user, then these values are added 808 to the user's queue 208. If not, then no values are added. If there are 810 more tags listed for the user in the update table 210, then the process is repeated for each tag. After each tag has been checked and all new values added to the queue, the last updated time for the user is changed 812 to reflect the update just completed. In this way, a complete queue is built for the user, and is then delivered to the web server. In one embodiment, DRE 118 confirms that the user is authorized to view the tag data for each tag in the user's queue. This prevents unauthorized users or users whose authorization changes during a session from being able to access data they are not supposed to access.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of the data retrieval engine and so forth may be provided in many or one module.

Some portions of the above description present the feature of the present invention in terms of algorithms and symbolic representations of operations on information. These algorithmic descriptions and representations are the means used by those skilled in the performance data arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A method for providing continuous real-time data across a network, the method comprising:
   a data retrieval engine, monitoring one or more data streams from one or more data sources;
   a webpage server, authorizing a first user to access the one or more data streams responsive to authenticating the first user;
   the data retrieval engine, building a first user queue for the first user by selectively including data of the one or more data streams in the first user queue, the data selected for the first user queue including data of the one or more data streams previously undelivered to the first user but not including data of the one or more data streams previously delivered to the first user; and
   the data retrieval engine, delivering data in the first user queue to the first user responsive to receiving a refresh request from the first user.

2. The method of claim 1, wherein building the first user queue for the first user comprises:
   the data retrieval engine, adding one or more first entries to a first table responsive to receiving data in the one or more data streams, the first entries indicating delivery times at which the data are provided by the one or more data sources;
   the data retrieval engine, comparing the first entries to a second entry for the first user in a second table, the second entry indicating a last update time at which data were previously delivered to the first user; and
   the data retrieval engine, adding data to the first user queue responsive to a first entry corresponding to the data to be added indicating time more recent than the last update time as indicated by the second entry corresponding to the first user.

3. The method of claim 2, wherein the first table further comprises entries for values and value times indicating times at which the values were measured at the one or more data sources.

4. The method of claim 2, further comprising the data retrieval engine, removing entries from the first table and the second table associated with the first user responsive to not receiving the refresh request from the first user for a predefined period of time.

5. The method of claim 2, further comprising the data retrieval engine, removing from the first table entries of data that are successfully delivered to the first user.

6. The method of claim 1, wherein delivering the data in the first user queue comprises assembling a web page including the data in the first user queue.

7. The method of claim 1, further comprising:
   the webpage server, authorizing a second user to access the one or more data streams responsive to authenticating the second user; and
   the data retrieval engine, building a second user queue for the second user by selectively including the data of the one or more data streams in the second user queue, the data selected for the second user queue including data of the one or more data streams previously undelivered to the second user but not including data of the one or more data streams previously delivered to the second user.

8. A system for providing continuous real-time data across a network, the system comprising:
   a web server adapted to authenticate a first user and to authorize the first user to access data in one or more data streams received at the system, the web server further adapted to deliver data in a first user queue to the first user responsive to receiving a refresh request from the first user; and
   a data retrieval engine operably coupled to the web server, adapted to provide the first user queue, the data retrieval engine operably coupled to the one or more data sources to receive the multiple data streams, the data retrieval engine further adapted to build the first user queue by selectively including data of the one or more data streams in the first user queue, the data selected for the first user queue including data of the one or more data streams previously undelivered to the first user but not including data of the one or more data streams previously delivered to the first user.

9. The system of claim 8, wherein the data retrieval engine comprises:
   a first table including a first entry indicating a delivery time at which data are provided by the one or more data sources; and
   a second table including a second entry indicating a last update time at which data were previously delivered to the first user via the web server, data added to the first user queue responsive to the time as indicated by the first entry corresponding to the data to be added being more recent than the last update time as indicated by the second entry corresponding to the first user.

10. The system of claim 9, wherein the first table further comprises entries for values and value times indicating times at which the values were measured at the data source.

11. The system of claim 9, wherein the data retrieval engine is further adapted to remove entries associated with the first user from the first table and the second table responsive to not receiving the refresh request from the first user for a predefined period of time.

12. The system of claim 9, wherein the data retrieval engine is further adapted to remove, from the first table, entries for data that are successfully delivered to the first user.

13. The system of claim 8, wherein the web server is further adapted to assemble a web page including the data of the first user queue, the web page delivered to the first user responsive to receiving the refresh request from the first user.

14. The system of claim 8, wherein the web server is further adapted to authenticate and authorize a second user to access the one or more data streams, and the data retrieval engine is further adapted to build a second user queue for the second user by selectively including data of the one or more data streams in the second user queue, the data selected for the second user queue including data of the one or more data streams previously undelivered to the second user but not including data of the one or more data streams previously delivered to the second user.

15. A computer program product for providing continuous real-time data across a network, the computer program product comprising a computer readable storage medium structured to store instructions executable by a processor, the instructions, when executed cause the processor to:
   at a data retrieval engine, monitor one or more data streams from one or more data sources;
   at a webpage server, authorize a first user to access the one or more data streams responsive to authenticating the first user;

at the data retrieval engine, build a first user queue for the first user by selectively including data of the one or more data streams in the first user queue, the data selected for the first user queue including data of the one or more data streams previously undelivered to the first user but not including data of the one or more data streams previously delivered to the first user; and at the data retrieval engine, deliver data in the first user queue to the first user responsive to receiving a refresh request from the first user.

16. The computer program product of claim 15, wherein the instructions to build the first user queue for the first user comprises instructions to:

add one or more first entries to a first table responsive to receiving data in the one or more data streams, the first entries indicating delivery times at which the data are provided by the one or more data sources;

compare the first entries to a second entry for the first user in a second table, the second entry indicating a last update time at which data were previously delivered to the first user; and add data to the first user queue responsive to a first entry corresponding to the data to be added indicating time more recent than the last update time as indicated by the second entry corresponding to the first user.

17. The computer program product of claim 16, wherein the first table further comprises entries for values and value times indicating times at which the values were measured at the one or more data sources.

18. The computer program product of claim 16, further comprising instructions to remove entries from the first table and the second table associated with the first user responsive to not receiving the refresh request from the first user for a predefined period of time.

19. The computer program product of claim 16, further comprising instructions to remove from the first table entries of data that are successfully delivered to the first user.

20. The computer program product of claim 15, wherein the instructions to deliver the data in the first user queue comprises instructions to assemble a web page including the data in the first user queue.

* * * * *